United States Patent [19]

Kroner et al.

[11] Patent Number: 5,374,681
[45] Date of Patent: Dec. 20, 1994

[54] POLYACETALS BASED ON DIVINYL ETHERS, DIHYDROXY COMPOUNDS AND MONOHYDROXY COMPOUNDS

[75] Inventors: Matthias Kroner, Eisenberg; Heinrich Hartmann, Limburgerhof; Richard Baur, Mutterstadt; Volker Schwendemann, Neustadt; Hans-Ulrich Jaeger, Neustadt; Johannes Perner, Neustadt, all of Germany

[73] Assignee: BASF Aktiengesellschaft, Ludwigshafen, Germany

[21] Appl. No.: 177,388

[22] Filed: Jan. 5, 1994

Related U.S. Application Data

[62] Division of Ser. No. 988,788, Dec. 10, 1992.

[30] Foreign Application Priority Data

Dec. 20, 1991 [DE] Germany ............... 4142130

[51] Int. Cl.$^5$ ............ C08L 29/02; C08G 67/02

[52] U.S. Cl. .................. 525/79; 525/50; 525/55; 525/242; 525/244; 525/298; 525/312; 528/230; 528/271; 528/392; 528/396

[58] Field of Search .......... 525/50, 55, 79, 242, 525/244, 263, 285, 298, 308, 312; 528/271, 392, 396, 230

[56] References Cited

U.S. PATENT DOCUMENTS

| | | | |
|---|---|---|---|
| 4,713,441 | 12/1987 | Heller et al. | 528/392 |
| 4,801,457 | 1/1989 | Heller et al. | 424/422 |
| 4,898,928 | 2/1990 | Heller et al. | 528/392 |

*Primary Examiner*—John Kight, III
*Assistant Examiner*—Shelley A. Dodson
*Attorney, Agent, or Firm*—Oblon, Spivak, McClelland, Maier & Neustadt

[57] ABSTRACT

Polyacetals useful as reduced-phosphate or phosphate-free detergent and cleaner additives are obtainable by cationically initiated polyaddition of
 (a) divinyl ethers and
 (b) dihydroxy compounds and also, optionally,
 (c) monohydroxy compounds
and have K values of from 8 to 100.

4 Claims, No Drawings

POLYACETALS BASED ON DIVINYL ETHERS, DIHYDROXY COMPOUNDS AND MONOHYDROXY COMPOUNDS

This is a division of application Ser. No. 07/988,788 filed on Dec. 10, 1992, now allowed.

The present invention concerns the use of polyacetals which are obtainable by cationically initiated polyaddition of (a) divinyl ethers and (b) dihydroxy compounds and also, optionally, (c) monohydroxy compounds and have K values of from 8 to 100 as additives in reduced-phosphate or phosphate-free detergent and cleaner formulations, and polyacetals obtainable by condensation of compounds (a), (b) and (c).

U.S. Pat. No. 2,104,000 discloses a process for the cationic polymerization of vinyl ethers wherein from 0.001 to 5% by weight of a virtually anhydrous inorganic acid is used as catalyst. Suitable catalysts are for example aluminum chloride, iron chloride, sulfuric acid, hydrochloric acid and boron trifluoride.

U.S. Pat. Re. No. 26,407 discloses the free-radical copolymerization of divinyl compounds, such as divinyl ether, divinyldimethylsilane or divinyl sulfone, with monoethylenically unsaturated monomers, for example vinyl acetate, maleic anhydride or dimethyl fumarate. Suitable catalysts are peroxy compounds, such as di-tert-butyl peroxide, hydrogen peroxide, alkyl hydroperoxides and diacyl peroxides. The polymerization can also be initiated with Ziegler catalysts. The polymers thus obtainable are fiber- and film-forming and can be used for producing coatings or packaging materials. They are also suitable for use as lubricants and lubricant additives, adhesives, and crosslinking agents for epoxy resins.

U.S. Pat. No. 3,328,468 discloses the preparation of homopolymers of the monovinyl ether of diethylene glycol using polymerization initiators which form free radicals under the polymerization conditions. The hydroxyl group of the monovinyl ethers of diethylene glycol remains practically unaffected by the free-radical polymerization. The polymers thus obtainable can replace polyols in foam production. This reference also discloses that monovinyl ethers of diols can be polymerized with cationic initiators to form polyacetals.

EP-A-0 359 055 discloses detergent formulations containing from 0.5 to 65% by weight of a surface-active agent and from 1 to 80% by weight of a builder comprising a polymer obtainable by free-radical copolymerization of divinyl ether and maleic anhydride in a molar ratio of 1:2 and subsequent hydrolysis of the anhydride groups and neutralization.

EP-A-0 379 166 discloses inter alia copolymers of alkyl vinyl ethers and hydroxyl-containing vinyl ethers, such as hydroxyethyl vinyl ether, hydroxypropyl vinyl ether, hydroxybutyl vinyl ether and alkoxylates of these hydroxyl-containing vinyl ethers. The copolymers are used in coating and molding compositions for improving the flow or as antifoams.

U.S. Pat. No. 3,131,162 discloses the copolymerization of monovinyl ethers of glycols with vinyl esters of saturated fatty acids having a carbon chain of up to 6 carbon atoms in the presence of peroxides. The copolymers can be vulcanized by the addition of customary vulcanizing aids to form rubber-like materials.

The reference Journal of Polymer Science: Polymer Letters Edition, 18 (1980), 293–297, discloses the preparation of polyacetals by acid-catalyzed addition of polyols to divinyl ether. For instance, polyaddition of trans-1,4-cyclohexanedimethanol to butanediol divinyl ether in the presence of p-toluenesulfonic acid as catalyst yields a polyacetal having a molecular weight of 200,000. The polyacetals described are used in medicine for the controlled release of drugs.

It is an object of the present invention to improve the primary detergency of reduced-phosphate and phosphate-free detergents and cleaners and to make available novel compounds.

We have found that this object is achieved by the use of polyacetals which are obtainable by cationically initiated polyaddition of
 (a) divinyl ethers and
 (b) dihydroxy compounds and also, optionally,
 (c) monohydroxy compounds
and have K values (determined by the method of H. Fikentscher at 25° C. in tetrahydrofuran on a polyacetal concentration of 1% by weight) of from 8 to 100 as additives in reduced-phosphate or phosphate-free detergent and cleaner formulations.

The object is also achieved by polyacetals obtainable by cationically initiated polyaddition of
 (a) divinyl ethers,
 (b) dihydroxy compounds and
 (c) monohydroxycompounds,
the molar ratio of (a):(b) being from 2:1 to 1.001:1 and the molar ratio of the vinyl ether groups in (a) to the sum total of the hydroxyl groups in (b) and (c) being from 2:1 to 1:1.

The monomers of group (a) include all divinyl ethers, eg. divinyl ether itself, furan, ethylene glycol divinyl ether, diethylene glycol divinyl ether, triethylene glycol divinyl ether, tetraethylene glycol divinyl ether, propylene glycol divinyl ether, 1,4-butanediol divinyl ether, 1,6-hexanediol divinyl ether, bis(hydroxymethyl)cyclohexanedimethanol divinyl ether, polytetrahydrofuran divinyl ethers with molecular weights of from 250 to 4,500, polyethylene glycol divinyl ethers with molecular weights of the polyethylene glycol of up to 20,000, polypropylene glycol divinyl ethers with molecular weights of up to 10,000, and also divinyl ethers of copolymers of polyethylene oxide and polypropylene oxide with molecular weights of up to 10,000 and also divinyl ethers of diols obtainable by elimination of water from polyols, for example dianhydrosorbitol divinyl ether, dianhydromannitol divinyl ether or dianhydroerythritol divinyl ether. All the divinyl ethers of the dihydroxy compounds mentioned hereinafter can be used.

The monomers of group (b), dihydroxy compounds, include in principle all compounds which have 2 OH groups, for example alkylene glycols, such as ethylene glycol, diethylene glycol, triethylene glycol, tetraethylene glycol, polyethylene glycols up to molecular weights of 10,000, propylene glycol, dipropylene glycol, polypropylene glycols with molecular weights of up to 10,000, copolymers of ethylene oxide and propylene oxide and optionally butylene oxide with molecular weights of up to 10,000, polytetrahydrofuran with molecular weights of up to 10,000, 1,2-butanediol, 1,3-butanediol, 1,4-butanediol, 1,2-pentanediol, neopentylglycol, 1,5-pentanediol, 1,2-hexanediol, 1,3-hexanediol, 1,4-hexanediol, 1,5-hexanediol, 1,6-hexanediol, 1,7-heptanediol, 1,8-octanediol, 2,5-dimethyl-2,5-hexanediol, 1,4-bis(hydroxymethyl)cyclohexane, pyrocatechol, resorcinol and hydroquinone. In addition to alkylene glycols and phenols it is also possible to use those dihydroxy compounds as monomers of group (b) which additionally carry further functional groups, for example ester, amide, nitrile, ether, acetal, imidoester, ketone, imide and thioether groups and also CC double or triple bonds. Examples of suitable compounds of this kind are dimethyl tartrate, diethyl tartrate, methyl 2,2-bis(hydroxymethyl)propionate, 3-hydroxy-2,2-dimethylpropyl hydroxypivalate, 2-butene-1,4-diol and 3-hexyne-2,5-diol, bis(2-hydroxyethyl) terephthalate, 1-phenylethylene glycol, and octadecanediol from hydrogenated castor oil. Examples of further suitable monomers of group (b) are dihydroxycarboxylic esters which can be isolated from natural fats and oils or are preparable by enzymatic, bacterial or chemical reactions. Examples of such compounds are dihydroxy fatty acids such as 10,12-dihydroxystearic acid, 9,10-dihydroxystearic acid, 9,12-dihydroxy-10-octadecenoic acid, 9,12-dihydroxy-9-oxo-10-octadecenoic acid, 10,13-dihydroxy-11-octadecenoic acid and 12,13-dihydroxy-9-oxo-10-octadecenoic acid. Dihydroxy fatty esters are also obtainable by hydroxylating and oxidizing fatty acids of natural origin, for example from ricinoleic acid, linoleic acid, oleic acid, linolenic acid, elaidic acid, palmitoleic acid, myristoleic acid, palmitic acid and stearic acid. Diols formed by elimination of water from polyols, for example dianhydrosorbitol, dianhydromannitol and dianhydroerythritol, are likewise suitable. Preferred monomers of group (b) are triethylene glycol, dimethyl tanrate and diethyl tartrate.

Suitable monohydroxy compounds of group (c), which are optionally includable in the cationically initiated polyaddition, are aliphatic and aromatic compounds which each have one hyroxyl group. The customarily envisioned hydroxyl-containing aliphatic and aromatic compounds have up to 30 carbon atoms in the molecule. These compounds are primarily alcohols and phenols. However, they may additionally contain further functional groups, for example ester, amide, nitrile, ether, acetal, amidoester, imide and thioether groups and also CC double or triple bonds. Examples of suitable compounds are monohydric $C_1$–$C_{30}$-alcohols, such as methanol, ethanol, n-propanol, isopropanol, n-butanol, isobutanol, tert-butanol, pentanols, 2-methylbutanol, 3-methylbutanol, tert-amyl alcohol, 3-methyl-3-pentanol, cyclohexanol, n-hexanol, n-octanol, isooctanol, decanol, dodecanol, stearyl alcohol and palmityl alcohol, and also oxo alcohols which are obtainable by addition of carbon monoxide and hydrogen to olefins by the oxo process, allyl alcohol, phenol, o-, m- and p-cresol, alkylphenols, benzyl alcohol, propargyl alcohol, butynol, 3-methyl-3-buten-1-ol, 3-methyl-2-buten-1-ol, 2-methyl-3-buten-1-ol, 2-methyl-3-butyn-2-ol and 1-ethynylcyclohexanol.

Further possible monomers of group (c) are reaction products of alcohols and phenols with from 1 to 100 mol of alkylene oxides. Suitable alkylene oxides are for example ethylene oxide, propylene oxide and butylene oxides. Suitable alkoxylation products are for example ethylene glycol monomethyl ether, ethylene glycol monoethyl ether, ethylene glycol monobutyl ether, propylene glycol monobutyl ether, 1,2-butylene glycol monomethyl ether, 2-(4-methoxyphenyl)ethanol, diethylene glycol monomethyl ether, diethylene glycol monoethyl ether, diethylene glycol monobutyl ether, reaction products of 1 mol of methanol with 3.9 or 25 mol of ethylene oxide, reaction products of an oxo alcohol with from 3 to 25 mol of ethylene oxide. Further suitable monofunctional alcohols are for example ethylenechlorohydrin, propylenechlorohydrin, 6-chlorohexanol, 8-chlorooctanol, methyl glycolate, ethyl glycolate, methyl lactate, ethyl lactate, isopropyl lactate, n-butyl lactate, isobutyl lactate, methyl mandelate, ethyl mandelate, hydroxypropionitrile, methyl hydroxybutyrate, ethyl hydroxylbutyrate, methyl hydroxyvalerate, ethyl hydroxyvalerate, isopropyl hydroxyvalerate, methyl hydroxyisovalerate, ethyl hydroxyisovalerate, methyl hydroxyisobutyrate, ethyl hydroxyisobutyrate, methyl hydroxypivalate, ethyl hydroxypivalate, ethyl benzylate, mandelonitrile, diethyl hydroxymalonate, diethyl hydroxymethylmaleate, diethyl hydroxymethylmalonate, diethyl malate, triethyl citrate, ethyl hydroxycrotonate, dimethyl malate, trimethyl citrate, tri-n-propyl citrate, methyl hydroxycrotonate, methyl 3-hydroxy-4-hexenoate, 2-hydroxy-3,3-dimethylbutyrolactone, hydroxyacetone, glycolaldehyde, vanillin, eugenol, salicylaldehyde and acetoin.

It is also possible to use hydroxy fatty esters preparable bacterially, enzymatically or by chemical hydroxylation of oils or fats of natural origin, for example on the basis of linoleic acid, linolenic acid, oleic acid, elaidic acid, ricinoleic acid, palmitic acid and stearic acid. This produces for example methyl 10-hydroxy-12-octadecenoate, methyl 10-hydroxy-12,15-octadecadienoate, methyl 12-hydroxyoleate, methyl ricinoleate, methyl 10-hydroxyoctadecanoate, methyl 10-hydroxystearate, methyl hydroxypalmitate, methyl 10-hydroxyhexadecanoate, methyl 13-hydroxy-12,13-epoxy-10-octadecanoate, methyl 9-hydroxy-10-oxo-12-octadecanoate and methyl 13-hydroxypalmitate.

The monomers (a), (b) and optionally (c) are polymerized cationically. This involves the addition of the OH group of a monomer of group (b) to a vinyl ether group of the monomer of group (a) to form an acetaldehyde acetal. This polymerization results in a polymeric backbone in which the monomer units are held together by acetaldehyde acetals. The cationic copolymerization of the monomers of groups (a), (b) and optionally (c) can be initiated with the aid of any organic or inorganic acidic substance. Suitable cationic initiators are for example oxalic acid, tartaric acid, adipic acid, succinic acid, succinic anhydride, citric acid, formic acid, acetic acid, propionic acid, malic acid, monohalogenated or polyhalogenated carboxylic acids, such as trifluoroacetic acid or trichloroacetic acid, hydrogen chloride, hydrogen bromide, hydrogen iodide, sulfuric acid, phosphoric acid, benzenesulfonic acid, p-toluenesulfonic acid, boric acid, ascorbic acid, acidic alumina, aluminum sulfate, potassium aluminum sulfate, iron(I) sulfate, iron(III) sulfate, aluminum oxide, titanyl sulfate, iron (III) chloride, boron trifluoride, boron trichloride, boron tribromide, iodine, ion exchangers in the acid form, and acid-loaded inert solid substances. The initiators for the cationic polymerization are customarily used in amounts of from 0.001 to 20, preferably from 0.01 to 1, by weight, based on the monomers of groups (a) and (b). The copolymerization is highly exothermic. Depending on the activity of the initiator used, the reaction temperatures range from −20° to 250° C., preferably from 0° to 200° C.

For example, in the presence of from 0.1 to 5% by weight of p-toluenesulfonic acid the monomers (a) and (b) will undergo an exothermic reaction to completion within 10 min at as low as 40° C. If the copolymerization is initiated with 0.2% by weight of oxalic acid, it will be complete at 90° C. within 1 hour and at 130° C.

within only 10 minutes. However, it is also possible for the copolymerization with oxalic acid to be carried out at 200° C., in which case it will take only a few seconds. In general, if the initiator employed is a relatively weak acid (tartaric acid, oxalic acid or citric acid) the temperature chosen will be above 70° C., while if strong acids, such as toluenesulfonic acid are used, the reaction temperatures will be maintained below 70° C. The copolymerization gives rise to usually colorless oils or resins which, if oxalic acid and tartaric acid are used as catalysts, are thermally very stable. The copolymers thus prepared are thermally stable up to 250° C.

The cationic polymerization of the monomers (a), (b) and optionally (c) is preferably carried out in the absence of a solvent. However, it is also possible to use inert diluents. This can be of advantage in certain cases, since the heat of reaction can then be readily removed with the aid of the evaporating diluent. If a strong acid is used as initiator, it is preferable to employ a solution of the initiator in a diluent, for example a from 0.005 to 10% by weight solution, particularly preferably a from 0.01 to 5% by weight solution, of p-toluenesulfonic acid in toluene.

Suitable diluents for the cationic copolymerization include all diluents which do not carry any functional groups capable of reaction with vinyl ethers. Preference is given to using those diluents which are readily obtainable in a water-free form and are not hygroscopic. Examples of suitable diluents are ethyl acetate, diethylene glycol diethyl ether, ethoxyethyl acetate, butoxyethyl acetate, aliphatic hydrocarbons, such as pentane, hexane, cyclohexane, n-heptane, n-octane and isooctane, and also aromatic hydrocarbons, such as toluene, xylene, mesitylene, tetralin and anisole. Suitable solvents also include tetrahydrofuran, dioxane and decalin, acetone, ethyl methyl ketone and cyclohexanone.

The copolymerization can be carried out for example as a one-pot reaction. This can be done by mixing the monomers of groups (a) and (b) and optionally (c) in a reaction vessel with the exclusion of atmospheric humidity, adding initiator, and heating to the required reaction temperature. In a preferred embodiment, the total amount of initiator is added to the reaction vessel at 20° C. together with 10% of the monomer mix of components (a), (b) and optionally (c) to be polymerized and the polymerization reaction is preferably initiated under inert gas by heating the initial charge in the reaction vessel. All the while the mixture is stirred, and stirring is also continued throughout the subsequent copolymerization. As soon as the polymerization has commenced, the remaining monomer mix of compounds of components (a), (b) and optionally (c) is added continuously or batchwise to the initial charge at such a rate that the heat of polymerization can be safely removed. If oxalic acid, tartaric acid or citric acid is used as initiator, the initiation of the copolymerization of monomers (a), (b) and optionally (c) requires temperatures of from about 70° to about 160° C. The acids then dissolve in the monomer mixture to form a homogenous solution and the polymerization commences.

In the case of initiators which are not soluble in the monomer mixture the heterogeneous reaction mixture is heated to 100°–250 ° C. until the polymerization commences.

After the copolymerization the initiator is either separated off or deactivated. Deactivation of the catalyst might be advisable because, in the presence of acidic substances and water or of other protic solvents, the copolymers are subject to hydrolysis with a decrease in molecular weight. To deactive the initiator the hot or cold reaction mixture is treated on termination of the copolymerization with alkalis, preferably sodium bicarbonate, sodium hydroxides, potassium hydroxides, sodium carbonate, potassium carbonate, ammonium carbonate, amines, such as ammonia, methylamine, dimethylamine, trimethylamine, ethylamine, diethylamine, dibutylamine, tributylamine, ethanolamine, diethanolamine, triethanolamine, morpholine or salts of strong bases and weak acids, such as sodium acetate, sodium formate or potassium bicarbonate. To deactivate the acidic initiators it is also possible to use calcium oxide, calcium hydroxide, basic aluminum oxide and also basic ion exchangers. Insoluble initiators are easy to remove by filtration.

In the case of polycondensation or polyaddition reactions the average degree of polymerization DP can be expressed as a function of the molar ratio q of the functional groups involved in the polymerization reaction by the following well-known equation:

$$DP = \frac{1+q}{1-q} = \frac{a+b}{a-b}, \text{ where } q = a/b$$

a = number of moles of divinyl ether
b = number of moles of dihydroxy compound

If the polyaddition reaction is carried out with vinyl ether groups in excess, ie. with a molar ratio of (a):(b) of from 2:1 to 1.001:1, then the polyacetal will contain vinyl ether end groups (VEEGs). The number of vinyl ether groups per mole of polyacetal can be calculated by means of the equation $$VEEGs = 2(a-b).$$

These vinyl ether end groups can add monohydric hydroxyl compounds (c) up to the following molar amounts (c):

$$c = 2(a-b),$$

preferably c = a − b being added.

To prepare polyacetals from the components (a), (b) and (c) the molar ratios are as follows:
a:b:c = from 2 to 1.001:1: from 0 to 2(a−1).

The following molar ratios are preferred:

| group a:group b:group c |
|---|
| 2:1:1 = 2:1:1 |
| 3:2:1 = 3/2:1:1/2 |
| 4:3:1 = 4/3:1:1/3 |
| 5:4:1 = 5/4:1:1/4 |
| ... |
| 11:10:1 = 11/10:1:1/10 |
| etc. |

The polyacetals are in general prepared by cationically initiated polyaddition of (a) divinyl ethers and (b) dihydroxy compounds in a molar ratio of from 2:1 to 1:2. To maximize the molecular weight obtained, the ratio of vinyl ether groups and hydroxyl groups employed in the polyaddition is preferably equimolar. If the monomers (a) and (b) are used in the polyaddition in such ratios as to produce polyacetals with vinyl ether groups, then the monomers of group (c) can be added thereto. This precondition always applies when the monomers (a) are used in the polyaddition in a stoichiometric excess compared with the monomers (b). In the case of a molar ratio of (a):(b) of from 2:1 to 1.001:1 the molar ratio of the vinyl ether groups in (a) to the sum total of the hydroxyl groups in (b) and (c) is from 2:1 to 1:1. When the molar ratio of the vinyl ether groups in (a) to the sum total of the hydroxyl groups in (b) and (c) is 1, the polyacetals contain no vinyl ether groups, whereas they do contain such groups at lower molar ratios. Polyacetals formed from the monomers (a), (b) and (c) are novel substances. Of particular interest of these are those polyacetals whose components (c) are esters derived from monohydroxycarboxylic acids. If hydroxylated fatty acids are used as monomers of group (b), it is possible to prepare novel detergent additives on the basis of fats and oils from replenishable resources.

In the case of polyethylene glycols, the hydroxyl group content can be determined by determining the OH number. The choice of hydrophilic and hydrophobic monomers determines the water solubility of the polyacetals. The polymers obtained have surfactant character. Measured according to DIN 53 993, they reduce the surface tension of water to 30–35 mN/m.

Hydrophilic monomers of group (b) are for example: ethylene glycol, diethylene glycol, triethylene glycol, tetraethylene glycol and polyethylene glycols having degrees of condensation above 5. Monomers with ester groups, for example diethyl tartrate, dimethyl tartrate, methyl dihydroxystearate and ethyl lactate, can be aftertreated after the polyaddition by means of sodium hydroxide, potassium hydroxide, ammonia, calcium hydroxide or other alkaline substances. This after-treatment serves to cleave ester groups, resulting in the formation of the carboxylate groups. Ionic groups have a strong hydrophilic effect.

Hydrophobic monomers of group (b) are for example: butanediol, hexanediol, bis(hydroxymethyl)cyclohexane, and octanediol. Monomers with ester groups, such as diethyl tanrate, methyl dihydroxystearate or ethyl lactate, also have a hydrophobic effect, as long as the ester groups are not converted into ionic carboxylates by an alkaline aftertreatment.

The choice of hydrophilic and hydrophobic components makes it possible to adjust the cloud point of the polymers in 1% strength aqueous solution at pH 7.5 within the range from 0° C. to 100° C., preferably within the range from 5° C. to 80° C. For example, a solution of a polymer of equimolar amounts of 1,4-butanediol divinyl ether and triethylene glycol has a cloud point of 25° C. An aqueous solution of a polymer of 1,4-butanediol divinyl ether and diethylene glycol has a cloud point of 5° C.

In the case of initiators which are soluble in the monomers, for example oxalic acid, tartaric acid, adipic acid or mandelic acid, it is preferable to introduce from 0.01 to 1% by weight of the initiator into the reaction vessel as initial charge at 20° C. together with the monomer of group (a) or (b) and/or (c), heat the contents to the reaction temperature, and add the monomer of group (b) or (a) and/or (c) continuously or batchwise in such a way that the heat of reaction can be removed. It is also possible to prepare mixtures of monomers of groups (a), (b) and (c) and to polymerize these mixtures. Preferably, a divinyl ether component is reacted firstly with the diol component and then, if employed, with the monohydric alcohol.

Particular preference is given to the use of polyacetals obtainable by acid-catalyzed polyaddition of (a) dihydroxyalkyl divinyl ethers, furan and/or divinyl ether, and (b) glycols, polyalkylene glycols, diphenols and/or dihydroxycarboxylic esters.

If the polyacetals are prepared using monomers of group (c), the preferred monomers of group (c) are monohydric alcohols, alkoxylated monohydric alcohols and/or monohydroxycarboxylic esters. Of particular interest for use as detergent additives are polyacetals obtainable by acid-catalyzed polyaddition of (a) dihydroxyalkyl divinyl ethers, and (b) tartaric esters and subsequent hydrolysis of the ester groups in the polyacetals with bases. Of particular suitability are polyaddition products of (a) butanediol divinyl ether, and (b) mixtures of triethylene glycol and dimethyl or diethyl tartrate in a molar ratio of from 4:1 to 1:1, obtainable by subsequent hydrolysis of the ester groups of the polyacetals with aqueous sodium hydroxide solution, potassium hydroxide solution, ammonia or amines.

Also of interest are those polyacetals which contain vinyl ether groups and are preparable by cationically initiated polyaddition of (a) divinyl ethers and (b) dihydroxy compounds and subsequent addition of (c) monohydroxy compounds to from 5 to 95%, preferably from 30 to 70%, of the vinyl ether groups in the polyacetal formed from (a) and (b). These polyacetals can be copolymerized as macromonomers together with other monoethylenically unsaturated monomers by the action of free-radical polymerization initiators. The resulting copolymers contain copolymerized units of the vinyl ether macromonomers as characteristic structural element. The K values of the copolymers range from 8 to 100 (measured by the method of H. Fikentscher in 1% by weight solution in tetrahydrofuran at 25° C.).

The macromonomers are preferably protected from acid-catalyzed hydrolysis by alkaline stabilizers, preferably sodium bicarbonate. The macromonomers are storable in the stabilized state. Immediately following their preparation they can be radical-polymerized with monoethylenically unsaturated monomers. Examples of comonomers which are used for this purpose are monoethylenically unsaturated carboxylic acids, for example acrylic acid, methacrylic acid, maleic acid, maleic anhydride, fumaric acid, esters of carboxylic acids, for example methyl acrylate, methyl methacrylate, n-butyl acrylate, tert-butyl acrylate, ethylhexyl acrylate, diethyl maleate, dimethyl maleate, dibutyl maleate, dimethyl fumarate, acrylamide, acrylonitrile and also vinyl acetate and styrene.

Suitable free-radical polymerization initiators include all the initiators customary for the polymerization of ethylenically unsaturated monomers, for example peroxides, hydroperoxides, peroxyesters, persulfates, hydrogen peroxide and azo initiators. The polymerization temperatures are preferably 50°–150° C.

The free-radical polymerization is preferably carried out without a diluent. However, in some cases it can be of advantage to use a diluent. Suitable diluents are for example: toluene, ethyl acetate, methanol, ethanol, isopropanol, n-propanol, butanols, tetrahydrofuran, dioxane, acetone, methyl ethyl ketone, polyethylene glycols having molecular weights of up to 10,000, polypropylene glycols, block copolymers of ethylene oxide and propylene oxide and also reaction products of 1 mol of $C_1$–$C_{20}$-alcohol with from 1 to 50 mol of ethylene oxide and/or propylene oxide.

After the copolymerization the copolymers are converted into an aqueous solution or dispersion. The solution or dispersion pH should be above 7.5.

By means of an alkaline aftertreatment of the copolymers, for example by the action of aqueous bases, such as sodium hydroxide solution, potassium hydroxide solution or calcium hydroxide, it is possible to hydrolyze ester groups with the formation of carboxylate groups. The treatment is preferably carried out in aqueous solution without the use of a solubilizer by completing the aftertreatment initially at from 0° to 30° C. and then, as the hydrolysis continues, at from 30° to 100° C. During the hydrolysis the polymer concentration is from 10 to 50% by weight.

The polyacetals and the copolymers which contain the above-described macromonomers as copolymerized units can be hydrolyzed by the action of acidic substances in protic media at below pH 7 to form acetaldehyde and other substances. This can be used to reduce the molecular weight of these polymers. These polymers have in particular dispersing properties and are likewise used as detergent additives.

The K values of the polyacetals range from 8 to 100, preferably from 10 to 40 (determined by the method of H. Fikentscher on a polyacetal concentration of 1% by weight in tetrahydrofuran at 25° C.).

The above-described polyacetals are used according to the invention as additives in reduced-phosphate and phosphate-free detergent and cleaner formulations. Reduced-phosphate detergent and cleaner formulations are those formulations which contain less than 25% by weight of phosphate, calculated as pentasodiumtriphosphate. The compositions of pulverulent detergent formulations can differ widely. Phosphate-free detergent formulations, in particular concentrated, pulverulent compact detergents contain, in addition to the customary surfactants, builders comprising zeolite and/or sheet-silicates in the form of crystalline or amorphous pulverulent hydrated sodium silicates. Silicates of this kind are known.; cf. EP-B-0164514 and EP-A-0444415. The same is true of the compositions of cleaner formulations. Detergent and cleaner formulations customarily contain surfactants in amounts of from 1 to 50% by weight, in some cases in even higher proportions, with or without builders. This is true not only of liquid but also of pulverulent detergent and cleaner formulations. Examples of the compositions of detergent formulations which are customary in Europe, the USA and Japan may be found for example in table form in Chemical and Engn. News, 67 (1989), 35, and also in Ullmanns Encyklopädie der technischen Chemie, Verlag Chemie, Weinheim 1983, 4th edition, pages 63–160. Further particulars concerning the compositions of detergent and cleaner formulations can be found in WO-A-90/13581.

The polyacetals and copolymers to be used according to the invention in detergent and cleaner formulations to improve the primary detergency of reduced-phosphate and phosphate-free cleaner and detergent formulations are easy to incorporate into these formulations, reduce the viscosity of water-containing surfactants, and produce stable, homogeneous detergent and cleaner formulations.

Owing to their viscosity-reducing effect, the polyacetals and copolymers to be used according to the present invention are important auxiliaries in the manufacture of reduced-phosphate and phosphate-free detergent and cleaner formulations. By using these auxiliaries it is possible to raise the slurry concentration in the crutcher to at least 80%. This makes for better economics through better utilization of the spray drying tower and for an energy saving, since less water needs to be evaporated. Similarly, the polyacetals and copolymers to be used according to the invention are usable with advantage wherever the preparation of mixtures involves a gel phase causing problems on account of its high viscosity.

The amounts of polyacetal or polyacetal-containing copolymer to be used according to the invention in detergent and cleaner formulations range from 0.1 to 50, preferably from 0.5 to 10, % by weight, based on the particular formulation.

In the Examples the percentages are by weight. The K values were determined by the method of H. Fikentscher, Zellulosechemie, 13 (1932), 58–64, 71–74, namely, unless otherwise stated, on a 1% by weight solution in tetrahydrofuran at 25° C.

EXAMPLES

Preparation of polyacetals

Polyacetal 1

In a 250 ml capacity round-bottomed flask, 69 g of 1,4-butanediol divinyl ether and 0.2 g of oxalic acid are heated to 80° C. As soon as that temperature is reached the addition is commenced, from a metering vessel, of 75 g of triethylene glycol over 30 minutes. The vinyl ether group content is determined at 30 minute intervals by iodine titration. Table 1 summarizes the values obtained.

TABLE 1

| Time (h) | Vinyl ether content (mol) |
|---|---|
| prior to start of addition | 1.0 |
| 1 | 0.29 |
| 1.5 | 0.14 |
| 2 | 0.11 |
| 2.5 | 0.06 |
| 3 | 0.03 |
| 3.5 | 0.02 |
| 4 | 0.01 |

Polyacetal 2

In a 250 ml capacity round-bottomed flask equipped with a stirrer and a dropping funnel 37.5 g of triethylene glycol, 44.5 g of diethyl tartrate and 0.2 g of oxalic acid are heated with stirring to 80° C. On attainment of that temperature 69 g of 1,4-butanediol divinyl ether are added dropwise in the course of 30 minutes. The reaction mixture is stirred at 80° C. for 10 hours, treated with 1 g of finely ground sodium bicarbonate and cooled. The polyacetal has a K value of 18. It is given an alkaline aftertreatment with 50 g of water and 70 g of 25% strength sodium hydroxide solution, converting the ester groups of the polymerized diethyl tartrate units present into carboxylate groups. The result is an aqueous solution of the polymer.

Polyacetals 3–7

The monomer mixture used was a mixture of diethyl tartrate, triethylene glycol and triethylene glycol as per Table 2. A 250 ml capacity round-bottomed flask equipped with a stirrer and metering means is charged with 0.4 g of oxalic acid and 1/10 of the monomer mixture. While the contents are stirred the temperature is raised to 130° C. and the remainder of the monomer mixture is metered in over 30 minutes. The reaction mixture is stirred at 130° C. for a further 3 hours and analyzed for vinyl ether groups by iodine titration. The residual levels of vinyl ether groups and the K values of the polyacetals are indicated in Table 2. After sodium bicarbonate has been added, a steam distillation is carried out. An alkaline aftertreatment with 100 ml of ethanol and 25% strength sodium hydroxide solution leaves an aqueous polymer solution on removal of the ethanol.

The key to the abbreviations used in Tables 2 and 3 is as follows:
DVE: 1,4-butanediol divinyl ether
TEG: triethylene glycol
DET: diethyl tartrate
VE: vinyl ether groups
Lac-E: ethyl lactate

TABLE 2

| Poly-acetal No. | DVE [g] | TEG [g] | DET [g] | VE [mol] | K value | 25% NaOH solution [g] | Polymer content [%] |
|---|---|---|---|---|---|---|---|
| 3 | 142 | 30 | 165 | 0.04 | 19 | 128 | 70 |
| 4 | 142 | 60 | 124 | 0.07 | 20 | 96 | 74 |
| 5 | 142 | 75 | 89* | 0.04 | 19 | 80 | 64 |
| 6 | 142 | 90 | 82 | 0.05 | 21 | 64 | 63 |
| 7 | 142 | 120 | 41 | 0.06 | 23 | 32 | 64 |

*dimethyl tartrate was used instead of DET.

Polyacetal 8

A 250 ml capacity round-bottomed flask is charged with 65 g of 1,4-butanediol divinyl ether, 0.2 g of oxalic acid is added, and the temperature is raised to 80° C. As soon as that temperature is reached, 84 g of diethyl tanrate are added and the mixture is held at 80° C. for a further 10 hours. The polymer has a K value of 14. Art alkaline aftertratment in an ice-bath with 75 g of 25% strength sodium hydroxide solution gives a clear 38% strength solution of the polymer in water.

Polyacetals 9–13

A 500 ml capacity round-bottomed flask is charged with amounts of 1,4-butanediol divinyl ether as per Table 3, 0.3 g of oxalic acid are added, and the temperature is raised to 90° C. Triethylene glycol is added and stirring is continued at 90° C. for a further 30 minutes. The vinyl ether group contents of the reaction mixtures are determined by iodine titration. The calculated and determined values are indicated in Table 3.

To saturate the remaining vinyl ether groups ethyl lactate is added and heating is continued for a further 30 minutes. The final value of the vinyl ether groups in the polyacetal is determined by renewed iodine titration.

Table 3 gives the quantities used and the vinyl ether group levels obtained after the polyaddition.

TABLE 3

| Poly-acetal No. | DVE [mol] | TEG [mol] | VE calc. [mol] | VE found [mol] | Lac-E [mol] | VE [mol] | K value |
|---|---|---|---|---|---|---|---|
| 9 | 1.05 | 1.0 | 0.1 | 0.17 | 0.17 | 0.017 | 21.05 |
| 10 | 1.1 | 1.0 | 0.2 | 0.25 | 0.25 | 0.03 | 20.3 |
| 11 | 1.2 | 1.0 | 0.4 | 0.47 | 0.47 | 0.007 | 15.5 |
| 12 | 1.5 | 1.0 | 1.0 | 1.07 | 1.07 | 0.05 | 11.8 |
| 13 | 2.0 | 1.0 | 2.0 | 2.0 |  |  | 9.1 |

General methods (a) for preparing macromonomers and (b) for free-radical polymerization thereof.

a) Preparation of macromonomers (Table 4):
A 250 ml round-bottomed flask equipped with a stirrer, a nitrogen inlet means, a thermometer and dropping funnel is charged under nitrogen with the amount of 1,4-butanediol divinyl ether indicated in Table 4 and 0.2 g of oxalic acid, and the contents are heated with stirring to 90° C., dissolving the oxalic acid. Then the streams 1 and 2 indicated in Table 4 are added, and stirring is continued for the indicated time. The conversion of the vinyl groups can be monitored by iodine titration.

b) Free-radical copolymerization (Table 5):
Sodium bicarbonate is added to the reaction mixture obtained in (a) to teminate the addition reaction and the feeding of stream 3 and stream 4 is commenced. The feed takes in each case 30 minutes. This is followed by 2 hours of stirring at that temperature. The K values of the copolymers are listed in Table 5.

The alkaline aftertreatment of the ester groups is carried out by treating the copolymer with 200 g of water and the amount of 25% strength aqueous sodium hydroxide solution indicated in Table 5 initially at 0° C. and, 5 hours later, at 20° C. An appropriate amount of water is added to obtain the solids content indicated in Table 5.

The key to abbreviations in Tables 4 and 5 is as follows:
DVE = 1,4-butanediol divinyl ether
DET = diethyl tartrate
TEG = triethylene glycol
DEM = diethyl maleate
EGMBE = ethylene glycol monobutyl ether
DEGMEE = diethylene glycol monoethyl ether
tBPP = tert-butyl perpivalate
tBPO = tert-butyl peroctoate
tBPB = tert-butyl perbenzoate
LacE = ethyl lactate

TABLE 4

Preparation of macromonomers

| Poly-acetal No. | Initial charge [g] | T [°C.] | Stream 1 TEG [g] | After-reaction time [min] | Stream 2 [g] | After-reaction time [min] |
|---|---|---|---|---|---|---|
| 14 | 69 | 120 | 60 | 5 | 11.8 EGMBE | 5 |
| 15 | 69 | 90 | 60 | 60 | 11.8 EGMBE | 60 |
| 16 | 69 | 115 | 60 | 5 | 11.8 EGMBE | 5 |
| 17 | 69 | 90 | 60 | 60 | 11.8 EGMBE | 60 |
| 18 | 69 | 115 | 60 | 5 | 11.8 EGMBE | 5 |
| 19 | 69 | 90 | 60 | 60 | 13.4 DEGMEE | 60 |
| 20 | 69 | 90 | 60 | 60 | 13.4 DEGMEE | 60 |
| 21 | 55.2 | 90 | 45 | 30 | 13.4 DEGMEE | 30 |
| 22 | 55.2 | 90 | 45 | 30 | 13.4 DEGMEE | 30 |
| 23 | 41.4 | 90 | 30 | 30 | 13.4 DEGMEE | 30 |
| 24 | 41.4 | 90 | 30 | 30 | 13.4 DEGMEE | 30 |
| 25 | 69 | 90 | 60 | 30 | 11.8 LacE | 30 |
| 26 | 76 | 90 | 75 | 30 | 7 DEGMEE | 30 |
| 27 | 83 | 90 | 75 | 30 | 13.4 DEGMEE | 30 |
| 28 | 96 | 90 | 90 | 30 | 13.4 DEGMEE | 30 |

TABLE 5

| Copolymer No. | Temp. [°C.] | Stream 3 DEM [g] | Stream 4 initiator [g] | Time [h] | K value | Sodium hydroxide solution [g] | Solids content [%] |
|---|---|---|---|---|---|---|---|
| 1 | 70 | 17 | 0.5 tBPP | 7 | 22 | 16 | 27 |
| 2 | 75 | 20 | 1.1 tBPP | 6 | 21 | 16 | 37 |
| 3 | 75 | 19 | 1.2 tBPP | 6 | 21 | 16 | 35 |
| 4 | 90 | 20 | 1.2 tBPO | 6 | 19 | 19 | 36 |
| 5 | 125 | 21 | 1.2 tBPP | 8 | 14 | 16 | 35 |
| 6 | 75 | 18 | 0.8 TBPP | 4 | 22 | 16 | 47 |
| 7 | 90 | 18 | 0.8 tBPO | 4 | 18 | 16 | 28 |
| 8 | 90 | 18* | 0.8 tBPO | 6 | 18 | 16 | 30 |
| 9 | 90 | 19 | 0.8 tBPO | 3 | 17 | 16 | 26 |
| 10 | 75 | 18 | 0.8 tBPP | 4 | 19 | 16 | 34 |
| 11 | 90 | 18 | 0.8 tBPO | 4 | 15 | 16 | 32 |
| 12 | 74 | 17 | 0.8 tBPP | 5 | 24 | 32 | 37 |
| 13 | 75 | 9 | 0.5 tBPP | 5 | 23 | 8 | 32 |
| 14 | 90 | 17 | 1.1 tBPP | 5 | 19 | 16 | 40 |
| 15 | 75 | 17 | 1.0 tBPP | 5 | 20 | 16 | 35 |

*plus an additional 0.5 g of maleic anhydride

Application properties

Some of the above-described polyacetals were tested as detergent additives in a liquid detergent under the hereinafter specified wash conditions. The results obtained are summarized in Table 6.

Wash conditions:
Primary detergency and graying

| | |
|---|---|
| Washing machine | Launder-o-meter |
| Wash temperature | 60° C. |
| Water hardness | 3 mmol of Ca/l = 16.8° German hardness |
| Ratio Ca:Mg | 3:1 |
| Wash time | 30 min (including heating-up time) |
| Wash cycles | 4 |
| Detergent dosage | 6 g/l |
| Liquor ratio | 14.3:1 |
| Fabric white fabric: | cotton-polyester fabric polyester fabric |
| soil cloth: | WFK 20 D (Wäscherei-forschung Krefeld) (replaced after every wash) |

Whiteness measurement in Elrepho in % reflectance
Whiteness of unwashed fabrics:

| | |
|---|---|
| Cotton/polyester | 80.4 |
| Polyester | 78.0 |
| WFK 20 D | 37.8 |

The values reported are in each case the reflectances of the individual fabrics before and after washing. The higher the reflectance difference on the WFK 20 D soil cloth is, the higher is the primary detergency. The smaller the differences on the white fabrics are, the better is the grayness inhibition.

For comparison a polymer-free detergent formulation was tested.

Liquid detergent

Formulation A

10% of sodium dodecylbenzenesulfonate, 50% strength in water

3% of reaction product of 1 mol of C13/15 oxo alcohol and 7 mol of ethylene oxide 2% of polypropylene glycol MW 600

77% of water

8% of polyacetal or of copolymer containing copolymerized macromonomer units

TABLE 6

| Example No. | | Primary detergency WFK 20 D | Grayness PES/Co | PES |
|---|---|---|---|---|
| | Polyacetal No. | | | |
| 1 | 1 | 52.9 | 69.0 | 70.0 |
| 2 | 2 | 55.7 | 69.2 | 71.5 |
| 3 | 3 | 56.9 | 67.9 | 74.3 |
| 4 | 4 | 59.7 | 69.2 | 74.0 |
| 5 | 5 | 57.2 | 69.9 | 74.0 |
| 6 | 6 | 60.2 | 69.5 | 73.3 |
| 7 | 7 | 58.2 | 68.5 | 73.7 |
| 8 | 8 | 59.9 | 64.0 | 70.0 |
| 9 | 9 | 54.4 | 68.5 | 71.1 |
| 10 | 10 | 54.3 | 69.3 | 73.0 |
| 11 | 11 | 54.2 | 70.9 | 74.1 |
| 12 | 12 | 52.1 | 70.1 | 74.4 |
| | Copolymer No. | | | |
| 13 | 1 | 62.2 | | |
| 14 | 2 | 62.2 | | |
| 15 | 3 | 62.2 | | |
| 16 | 4 | 63.4 | | |
| 17 | 5 | 58.7 | | |
| 18 | 6 | 62.2 | | |
| 19 | 7 | 61.4 | | |
| 20 | 8 | 64.7 | | |
| 21 | 9 | 62.4 | | |
| 22 | 10 | 62.8 | | |

TABLE 6-continued

| Example No. | Primary detergency WFK 20 D | Grayness PES/Co | PES |
|---|---|---|---|
| 23 | 11 | 63.2 | |
| 24 | 12 | 59.6 | 74.8 | 76.3 |
| 25 | 13 | 57.5 | 71.5 | 75.8 |
| 26 | 14 | 59.5 | 71.6 | 74.7 |
| 27 | 15 | 59.7 | 70.6 | 71.7 |
| Comparative Ex. 1 | without polymer | 50.9 | 67.0 | 71.6 |

As can be seen from the washing trials, the polyacetals improve the primary detergency appreciably without increased graying occurring on polyester-cotton blend fabric or polyester fabric.

All the polymers according to the invention are readily incorporable into detergent formulation A and produce stable, homogeneous solutions.

Viscosity-reducing effect

A mixture is prepared of the anhydrous surfactant A (addition product of 7 mol of ethylene oxide with 1 mol of a $C_{12/15}$ oxo alcohol mixture) and copolymers No. 7, 9, 10, 12, 13 and 15. The proportion of copolymer in the mixture is in each case 5%, based on surfactant. Table 7 shows the viscosities of mixtures of surfactant A and the copolymers at different water contents. As can be seen therefrom, the copolymers act as viscosity reducers in respect of the water-containing surfactant A.

TABLE 7

| | Viscosity [mpas] of mixture of surfactant A, copolymer and water | | | |
|---|---|---|---|---|
| | Surfactant content | | | |
| Copolymer No. | 80% | 60% | 40% | 20% |
| 7 | 127 | 9,350 | 402 | 237 |
| 9 | 106 | 7,350 | 519 | 264 |
| 10 | 92 | 17,500 | 392 | 245 |
| 12 | 123 | 8,300 | 349 | 374 |
| 13 | 102 | 3,740 | 416 | 144 |
| 15 | 96 | 8,130 | 381 | 192 |
| Comparative Example 2 without polymer | 46,000 | 25,000 | 158,000 | 1,000 |

We claim:

1. Polyacetals obtained by cationically initiated polyaddition of
   (a) divinyl ethers,
   (b) dihydroxy compounds and
   (c) monohydroxy compounds,
the molar ratio of (a):(b) being from 2:1 to 1.001:1 and the molar ratio of the vinyl ether groups in (a) to the sum total of the hydroxyl groups in (b) and (c) being from 2:1 to 1:1.

2. Polyacetals as claimed in claim 1, wherein component (c) is an ester derived from a monohydroxycarboxylic acid.

3. Polyacetals as claimed in claim 1, obtained by cationically initiated polyaddition of (a) divinyl ethers and (b) dihydroxy compounds and subsequent addition of (c) monohydroxy compounds to from 5 to 95% of the vinyl ether groups in the polyacetal from (a) and (b), so that the polyacetals have vinyl ether groups.

4. Copolymers obtained by copolymerizing monoethylenically unsaturated monomers under the action of free-radical polymerization initiators with polyacetals containing vinyl ether groups as claimed in claim 3 as copolymerized units.

* * * * *